United States Patent
Weerts et al.

(10) Patent No.: US 6,410,183 B2
(45) Date of Patent: *Jun. 25, 2002

(54) BATTERY SEPARATOR WITH IMPROVED SHOULDERS

(76) Inventors: Daniel E. Weerts, 3908 Sedgewick Pl., SE., Albany, OR (US) 97321; Gordon B. Dobbie, 1355 SW. Timian St., Corvallis, OR (US) 97333

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/293,046

(22) Filed: Apr. 16, 1999

(51) Int. Cl.⁷ .......................... H01M 2/16; H01M 2/18; H01M 2/14
(52) U.S. Cl. ..................... 429/143; 429/129; 429/136
(58) Field of Search ................. 429/129, 142, 429/143, 139

(56) References Cited

U.S. PATENT DOCUMENTS

| | | |
|---|---|---|
| 4,368,243 A * | 1/1983 | O'Rell et al. ............. 429/147 |
| 4,407,063 A | 10/1983 | Johnson |
| 4,788,113 A | 11/1988 | Bohle et al. |
| 4,927,722 A | 5/1990 | Bohnstedt et al. |
| 5,554,464 A * | 9/1996 | Stempin et al. ............. 429/247 |
| 5,558,952 A | 9/1996 | Knauer |
| 5,679,479 A | 10/1997 | Young et al. |
| 5,716,734 A | 2/1998 | Nakano |
| 5,789,103 A | 8/1998 | Young et al. |
| 5,894,055 A | 4/1999 | Young et al. |
| 5,985,484 A | 11/1999 | Young et al. |
| 6,001,507 A | 12/1999 | Hercamp |

FOREIGN PATENT DOCUMENTS

| EP | 0 484 295 | 5/1992 |
|---|---|---|
| EP | 0 899 801 | 3/1999 |

* cited by examiner

*Primary Examiner*—Stephen Kalafut
*Assistant Examiner*—Julian A. Mercado
(74) *Attorney, Agent, or Firm*—Robert E. Howard

(57) ABSTRACT

A battery separator for use in enveloping the plates of a flooded cell type lead acid battery. The separator has improved puncture resistance in the shoulder areas provided by a plurality of improved mini-ribs located therein. The mini-ribs have substantially flat upper surfaces, and the space between adjacent mini-ribs is less than about 0.0225 inch. The separator may also have a plurality of micro-ribs located on the backside.

15 Claims, 2 Drawing Sheets

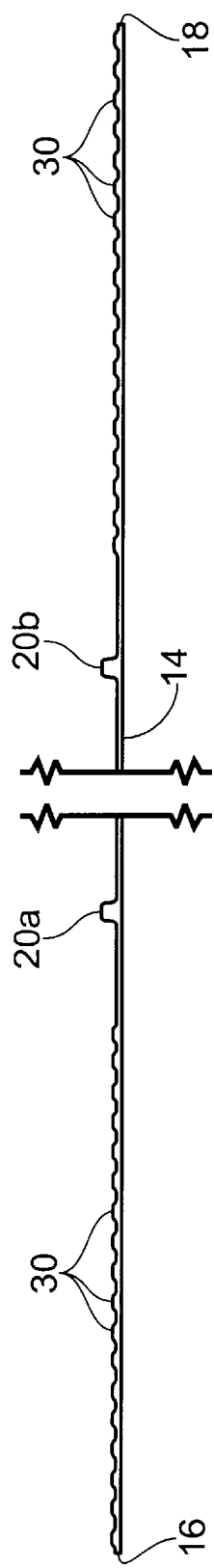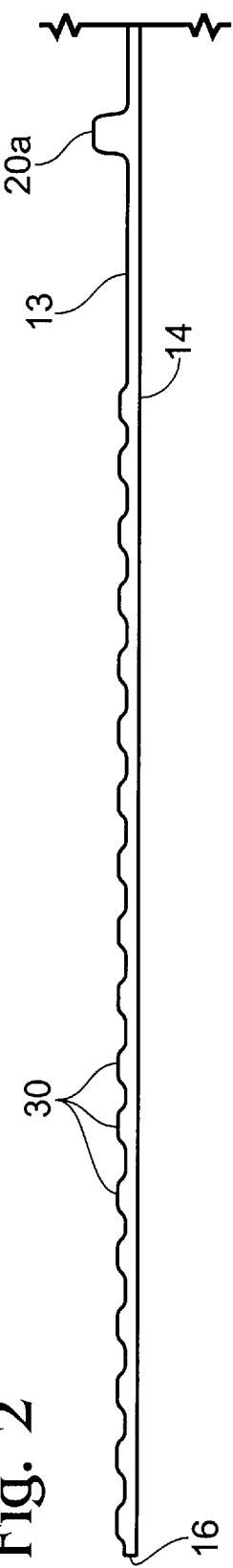

BATTERY SEPARATOR WITH IMPROVED SHOULDERS

BACKGROUND OF THE INVENTION

This invention relates to a battery separator for use in flooded cell type lead acid batteries. The separator has a shoulder design that provides improved resistance to puncture.

Separators are used in lead acid batteries to separate the positive and negative plates. Such separators are formed of materials that have sufficient porosity to permit the battery's electrolyte to reside in the pores of the material, thereby permitting ionic current to be established between adjacent positive and negative plates, but not so porous as to allow physical contact between the plates or "treeing" of lead between adjacent plates.

The most commonly used material in flooded cell type lead acid batteries is microporous polyethylene. Such separators and their method of manufacture are, essentially, described in U.S. Pat. No. 3,351,495.

Typically such separators have multiple "major" ribs formed on at least that planar face of the "backweb" which is to face the positive plate. Such major ribs are typically formed parallel to the longitudinal edges of the backweb and typically have a height above the backweb that is greater than the thickness of the backweb.

Although at one time separators were manufactured as sheets which were placed between the plates, the overwhelming configuration currently used is to wrap the separator material around either the negative or positive plates and seal the separators, which has a width greater than the wrapped plates, along both edges to thereby form an "envelope" around each wrapped plate. The separator edges adjacent the plate edges, where sealing of the separator is effected, is known as the "shoulder" area of the separator.

U.S. Pat. No. 4,407,063 discloses the most commonly used method and apparatus for enveloping and sealing separators around plates for lead acid batteries.

One method of making plates for lead acid batteries is to cut, slit, and expand a lead sheet. Such "expanded metal" plates often have sharp metal protrusions, called "bent wires", which can abrade and puncture the adjacent separator shoulder thereby causing a short circuit and premature failure of the battery. Such punctures can occur during enveloping, during battery assembly, or after manufacture of the battery.

One approach to preventing such punctures is to make the shoulder area thicker than the thickness of the adjacent backweb. This approach is disclosed in U.S. Pat. No. 4,788,113.

Another approach has been to form "mini-ribs" in the shoulder area. Such mini-ribs have a cross-section that is the arc of a circle. The height of such mini-ribs above the backweb is less than that of the major ribs, typically 0.007 inch. Such prior art mini-ribs are also spaced closer together than the major ribs, a typical such mini-rib spacing being 0.0626 inch. The use of mini-ribs is preferable over using a thicker shoulder area because of cost considerations. However, it has been found that many punctures still occur in the shoulder area with separators using current mini-rib configurations.

It is an object of the present invention to provide a separator having an improved shoulder design that greatly reduces puncture by bent wires.

SUMMARY OF THE INVENTION

The present invention is a battery separator having a shoulder design that has improved puncture resistance. The separator of the invention has a plurality of mini-ribs extending from one planar face of the separator in the shoulder area, the mini-ribs having a flattened upper surface rather than the rounded upper surfaces of prior art mini-ribs. The maximum spacing between the mini-ribs of the invention is 0.0225 inch.

In another embodiment of the invention, a plurality of micro-ribs extend from the planar surface of the separator opposite the planar surface from which the mini-ribs extend.

BRIEF DESCRIPTION OF THE DRAWINGS

FIG. 1 is a partial end view of one embodiment of the battery separator of the invention;

FIG. 2 is an enlarged end view of one shoulder portion of the battery separator illustrated in FIG. 1;

DESCRIPTION OF THE PREFERRED EMBODIMENTS

Figure 3:
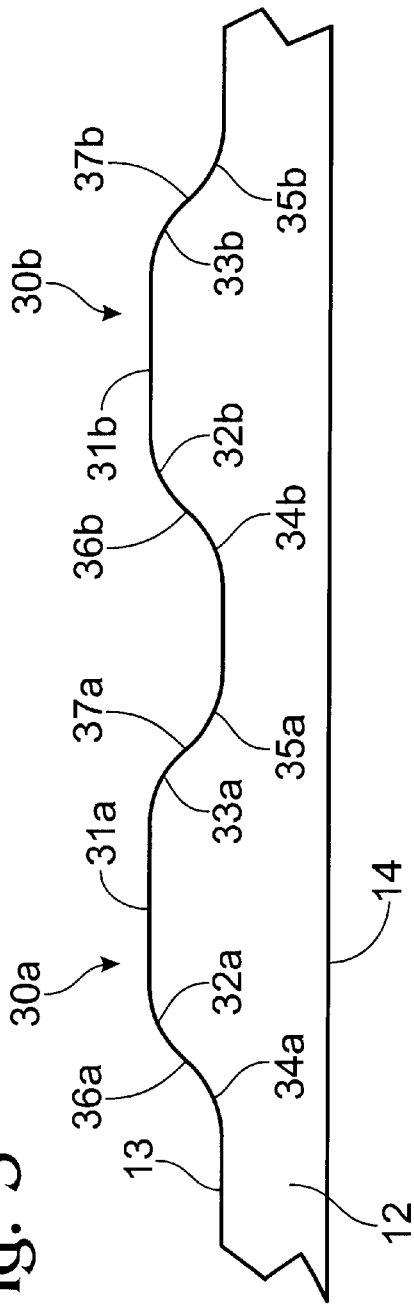
FIG. 3 is an enlarged end view of two adjacent mini-ribs of the invention.

The battery separator 10 of this invention is comprised of a backweb 12 having a first (upper) planar surface 13, a second (lower) planar surface 14, a first edge 16, and a second edge 18. Lower planar surface 14 will also be referred to as the "backside".

A plurality of major ribs 20 are located across the width of separator 10, only the two major ribs 20a and 20b closest to edges 16 and 18, respectively, being shown in FIG. 1. Major ribs 20 are typically disposed longitudinally along the length of separator 10, parallel to each other and to edges 16 and 18. However, major ribs 20 may be located at an angle to edges 16 and 18 (i.e., be diagonally disposed), or may be sinusoidal rather than straight.

Major ribs 20 may have any cross-sectional configuration used in the art, including those configurations disclosed in U.S. Pat. No. 5,679,479. Additional ribs located in that portion of the separator where the major ribs are located, such as disclosed in U.S. Pat. No. 5,789,103, may also be used.

Located between the end ribs 20a and 20b and the edges 16 and 18, respectively, are the shoulder areas of separator 10. A plurality of mini-ribs 30 are located in the shoulder areas. Mini-ribs 30 are longitudinally disposed along the length of separator 10, and are substantially evenly spaced from each other. Although it is preferred that mini-ribs 30 extend from only one planar face of separator 10, they may extend from both planar faces in the shoulder area, and may be staggered so that a mini-rib on one planar surface is located between two mini-ribs located on the other planar surface.

Mini-ribs 30 are preferably disposed substantially parallel to each other and to edges 16 and 18. However, mini-ribs 30 may have other configurations, such as being at an angle to the edges 16 and 18 of separator 10 sinusoidal rather than straight.

FIG. 3 is an enlarged end view of two adjacent mini-ribs 30a and 30b. As can be seen, mini-rib 30a has a flat apex or upper surface 31a. Flat upper surface 31a is bounded by two upper edges 32a and 33a. The base of mini-rib 30a is bounded by two lower edges 34a and 35a, located at the juncture of mini-rib 30a and backweb 12. Mini-rib 30a has sloping side walls 36a and 37a which extend between upper edges 32a and 33a and lower edges 34a and 35a, respectively. Upper edges 32*a* and 33*a* and lower edges 34*a* and 35*a* are, preferably, rounded as shown in FIG. 3.

Likewise, mini-rib 30*b*, which is identical to mini-rib 30*a*, has a flat apex or upper surface 31*b* bounded by upper edges 32*b* and 33*b*, lower edges 34*b* and 35*b*, and sloping side walls 36*b* and 37*b*.

Currently used mini-ribs have rounded apexes, i.e., the cross-section of such prior art mini-ribs is solely the arc of a circle, typically having a radius of 0.007 inch.

The height of the flat upper surface 31 of mini-ribs 30 above the upper planar surface 13 of the backweb 12 of separator 10 is between about 0.003 and about 0.006 inch, preferably between about 0.003 and about 0.004 inch. Currently used mini-ribs typically have a height of about 0.007 inch.

The width of the flat upper surface 31 is between about 0.008 and about 0.018 inch, preferably between about 0.010 and about 0.012 inch.

The spacing between adjacent upper edges of adjacent mini-ribs 30, i.e., the distance between edges 33*a* and 32*b* as seen in FIG. 3, is critical to minimizing puncture resistance in the shoulder area. The present inventors been found that if that spacing is less than about 0.0225 inch, and preferably between about 0.018 and about 0.020 inch, the vast majority of grid wires will not be able to contact the thinner backweb 12 where puncture resistance is low, but will contact the thicker area occupied by a mini-rib 30, thereby minimizing the ability of the wire to penetrate through the separator 10 in the shoulder area.

Currently used mini-ribs typically are spaced apart a distance of 0.0626 inch, which the current inventors have found is much greater than the cross-sectional size of many grid wires, thereby more easily permitting the grid wire to come into contact with the backweb where penetration is more easily achieved.

Another preferred embodiment of the invention is one wherein a plurality of "micro-ribs" 40 extend from the backside 14 of the separator.

Micro-ribs 40 are preferably substantially evenly spaced apart across the entire width of the backside 14 of separator 10, and run longitudinally along the length of the separator 10, substantially parallel to each other and to edges 16 and 18. However, the micro-ribs 40 may be disposed at an angle to edges 16 and 18, i.e., be diagonally disposed, or be sinusoidal rather than straight.

Figure 4:
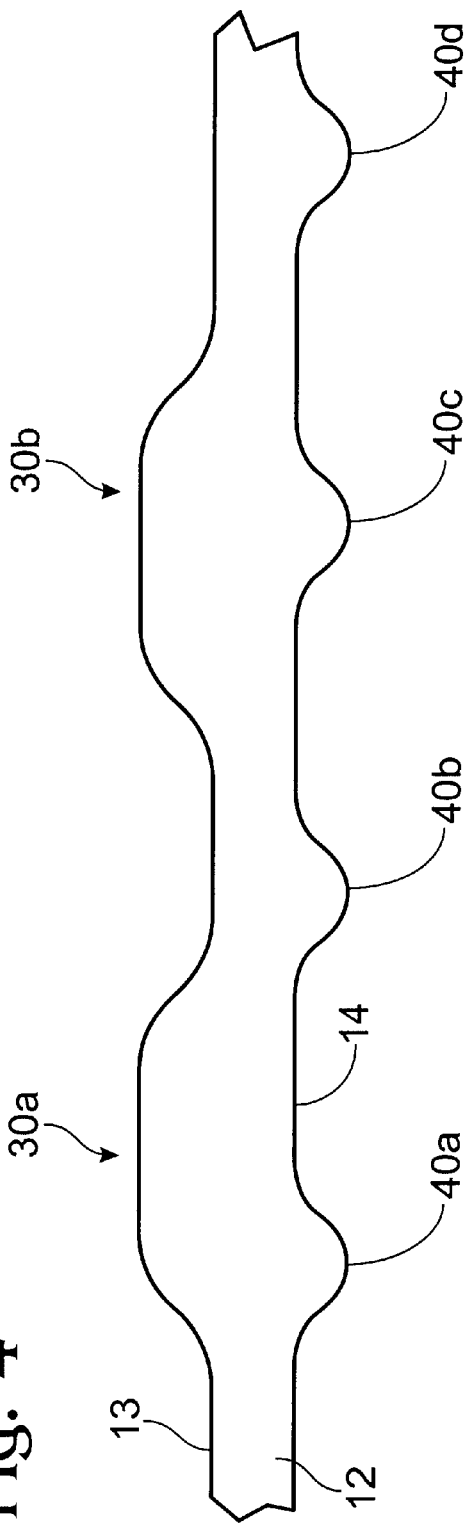
FIG. 4 is a partial end view of another embodiment of the battery separator of the invention using micro-ribs.

The cross-section of micro-ribs 40 is preferably the arc of a circle, as can be seen in FIG. 4 which illustrates four adjacent micro-ribs 40*a*, 40*b*, 40*c*, and 40*d*. The height of micro-ribs 40 above the backside is between about 0.003 and about 0.006 inch, preferably between about 0.003 and about 0.004 inch.

The distance between micro-ribs 40, measured center-to-center, is less than about 0.0225 inch, preferably between about 0.018 and about 0.020 inch.

Example 1 below describes a specific configuration for a battery separator having the mini-rib configuration of this invention.

EXAMPLE 1

A microporous polyethylene battery separator was made having the following characteristics, all dimensions being in inches:

| | |
|---|---|
| Separator width: | 6.4 |
| Backweb thickness: | 0.006 |
| Major ribs: | |
| Number: | 20 |
| Height: | 0.019 |
| Width: | 0.015 |
| Spacing: | 0.263 |
| Mini-Ribs: | |
| Number: | 18 (each shoulder) |
| Height: | 0.004 |
| Width: | 0.010 |
| Spacing: | |
| Upper edges: | 0.0225 |
| Centers: | 0.0325 |
| Lower edges: | 0.0066 |
| Other: | 0.131 (distance between centers of adjacent major rib and mini-rib |

EXAMPLE 2

Separators having the configuration described in Example 1 were tested for puncture resistance. The method used for testing for puncture resistance was a modified BCI Test Method 3.214. The modification consisted of substituting a pin having cross-sectional dimensions of 0.0225 inch×0.0325 inch for the pin size specified in the original test method. The reason for the substitution of pins was to use a pin which more closely approximated smaller grid wires. The puncture resistance of a large number of Example 1 separators averaged 0.75 pound.

Comparative Example 1

Prior art separators were also tested for puncture resistance using the same modified test procedure used in Example 2. These prior art separators had the same dimensions of the Example 1 separators with the exception that the mini-ribs of such prior art separators were spaced apart a distance of 0.0626 inch (center-to-center) and the cross-section of the mini-ribs was the arc of a circle having a radius of 0.007 inch. The average puncture resistance of a large number of such prior art separators was 0.62 pound.

While specific embodiments have been described, it is not intended that they restrict the scope of the invention beyond that set forth in the appended claims.

The invention claimed is:

1. A battery separator, comprising:
    a backweb of porous, acid resistant material, the backweb having opposed first and second planar surfaces and first and second outer edges, the first planar surface having first and second shoulder areas adjacent the first and second edges, respectively, and a major rib area positioned between the first and second shoulder areas;
    a plurality of major ribs extending outwardly from the first planar surface and confined within the major rib area;
    first and second sets of multiple mini-ribs extending outwardly from the first planar surface and confined within the respective first and second shoulder areas, the mini-ribs in the first and second sets running in a direction generally along the respective first and second outer edges, and adjacent mini-ribs in each of the first and second sets being of uniform height and shape and spaced apart by a uniform distance;

each of the multiple mini-ribs in the first and second sets having a flat upper surface and a base joined by two sloping side walls, the upper surface bounded by curved opposite upper edges that merge with the sloping side walls and the base bounded by curved opposite lower edges that merge with the planar surface; and multiple micro-ribs extending outwardly from the second planar surface of the backweb, the micro-ribs running in a direction along the width of the second planar surface and adjacent ones of the micro-ribs spaced apart by a uniform distance.

2. The battery separator of claim 1, in which:

the heights and shapes of the mini-ribs in the first set are of the same heights and shapes, respectively, of the mini-ribs in the second set; and the uniform distance between adjacent mini-ribs in the first set is the same as the uniform distance between adjacent mini-ribs in the second set.

3. The battery separator of claim 1, in which the adjacent mini-ribs in each of the first and second sets are spaced apart a uniform distance of between anout 0.0180 inch and about 0.0225 inch.

4. The battery separator of claim 1, in which the adjacent mini-ribs in each of the first and second sets are spaced apart a uniform distance of between about 0.018 inch and about 0.020 inch.

5. The battery separator of claim 1, in which the uniform height of the flat upper surface of the mini-ribs in each of the first and second sets is between about 0.003 inch and about 0.006 inch above the first planar surface of the backweb.

6. The battery separator of claim 1, in which the uniform height of the flat upper surface of the mini-ribs in each of the first and second sets is between about 0.003 inch and about 0.004 inch above the first planar surface of the backweb.

7. The battery separator of claim 1, in which the flat upper surface of each of the mini-ribs in the first and second sets is between about 0.008 inch and about 0.012 inch in width.

8. The battery separator of claim 1, in which the backweb material is a composition adapted to be formed into an envelope around a lead acid battery plate.

9. The battery separator of claim 1, in which the backweb material is microporous polyethylene.

10. The battery separator of claim 1, in which the adjacent micro-ribs are spaced apart a uniform distance of less than about 0.0225 inch.

11. The battery separator of claim 1, in which the adjacent micro-ribs are spaced apart a uniform distance of between about 0.018 inch and about 0.020 inch.

12. The battery separator of claim 1, in which the micro-ribs are of a uniform height of between about 0.003 inch and about 0.006 above the second planar surface of the backweb.

13. The battery separator of claim 1, in which each of the multiple micro-ribs has a rounded upper surface.

14. The battery separator of claim 1, in which the backweb material is a composition adapted to be formed into an envelope around a lead acid battery plate.

15. The battery separator of claim 1, in which the backweb material is microporous polyethylene.

* * * * *